United States Patent
Fukumoto et al.

(10) Patent No.: US 7,144,659 B2
(45) Date of Patent: Dec. 5, 2006

(54) NEGATIVE ELECTRODE AND LITHIUM ION SECONDARY BATTERY USING THE SAME

(75) Inventors: Yusuke Fukumoto, Moriguchi (JP); Yasuhiko Hina, Yokohama (JP); Kaoru Inoue, Hirakata (JP); Tsuyoshi Iwakura, Wakayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 261 days.

(21) Appl. No.: 10/614,023

(22) Filed: Jul. 8, 2003

(65) Prior Publication Data
US 2004/0013942 A1    Jan. 22, 2004

(30) Foreign Application Priority Data
Jul. 8, 2002    (JP)    ............... 2002-198591

(51) Int. Cl.
*H01M 4/48*    (2006.01)
(52) U.S. Cl. .................. 429/231.8; 429/231.4; 429/231.1; 429/231.3; 429/231.6; 252/502; 252/182.1
(58) Field of Classification Search ............ 429/231.1, 429/231.4, 231.8, 231.3, 231.6; 252/502, 252/182.1
See application file for complete search history.

(56) References Cited

U.S. PATENT DOCUMENTS
6,805,996 B1    10/2004    Hosoya
2002/0037458 A1    3/2002    Hosoya FOREIGN PATENT DOCUMENTS
CN    1324120 A    11/2001
JP    11-263612    *  9/1999
JP    2000-195518    *  7/2000
JP    2000-294283    10/2000

* cited by examiner

*Primary Examiner*—Laura Weiner
(74) *Attorney, Agent, or Firm*—McDermott Will & Emery LLP

(57) ABSTRACT

A negative electrode for a lithium ion secondary battery comprising a material mixture layer comprising a carbonaceous material comprising a spherical natural graphite and a graphitized carbon fiber, wherein the material mixture layer has a carbon density of not less than 1.6 g/cm$^3$; the spherical natural graphite has: (1) an interplanar spacing $d_{002}$ between the (002) planes determined by an X-ray diffraction pattern of 0.3354 to 0.3357 nm, (2) a mean particle circularity of not less than 0.86, and (3) a mean particle size of 5 to 20 µm; the graphitized carbon fiber has: (1) a mean fiber length of 20 to 200 µm, and (2) a mean aspect ratio of 2 to 10; and the amount of the graphitized carbon fiber is 50 to 90% by weight of whole of the carbonaceous material.

2 Claims, 2 Drawing Sheets

NEGATIVE ELECTRODE AND LITHIUM ION SECONDARY BATTERY USING THE SAME

BACKGROUND OF THE INVENTION

In recent years, there has been a rapid advancement in the development of potable and cordless electronic apparatuses for consumers. Accordingly, demand is now growing for small-size and light-weight batteries with higher energy density as a power source for driving these electric appliances. In particular, lithium ion secondary batteries are expected to grow greatly in the future as a power source for notebook computers, cell phones, AV devices, etc because they have high voltage and high energy density.

For the positive electrode for a lithium ion secondary battery, lithium-containing composite oxides such as $LiCoO_2$, $LiNiO_2$, $LiMnO_2$, $LiMn_2O_4$ are employed.

For the negative electrode, on the other hand, various kinds of carbonaceous materials are used. Although it is known that carbonaceous materials include crystalline materials and amorphous materials, crystalline graphite is mostly used these days. The reasons why graphite is mostly used for the negative electrode include: (i) capacity per weight is large, (ii) the carbon density of a negative electrode material mixture layer is increased, (iii) the initial irreversible capacity of the negative electrode is low, etc. Thus, there have been studies on a higher capacity negative electrode using graphite.

Since the theoretical capacity of graphite is 372 mAh/g, the efforts to create a higher capacity material have their limitations. In order to further reduce the irreversible capacity, methods such as to optimize the composition of a non-aqueous solvent in a non-aqueous electrolyte and the surface state of graphite have already been taken. Therefore, the only approach left to create a higher capacity negative electrode is presumably to increase the carbon density of a negative electrode material mixture layer. For example, Japanese Laid-Open Patent Publication No. 2000-195518 and Japanese Laid-Open Patent Publication No. 2000-294283 disclose that the use of a mixture of graphitized carbon fiber and graphite gives a negative electrode with a carbon density of not less than 1.6 g/cm$^3$, which is determined by dividing the weight of the carbonaceous material in the material mixture layer by the volume of the material mixture layer.

Japanese Laid-Open Patent Publication No. 2000-195518 discloses a negative electrode comprising a mixture of carbon fiber material and another carbonaceous material, wherein acrylic rubber-based copolymer is contained as a binder. The publication also describes that, in the case where the negative electrode has a carbon density of not less than 1.3 g/cm$^3$, the following tendencies are observed: a conductive network within the carbonaceous materials is enhanced, the electrode utilization rate is increased and the binding property between active materials is improved.

However, the problem arises that the irreversible capacity of carbon per weight is increased when the negative electrode is rolled until the material mixture layer has a carbon density of not less than 1.4 g/cm$^3$ in order to obtain a higher capacity negative electrode comprising a mixture of graphitized carbon fiber and flake graphite. Although the details of the cause are unknown, it is presumably because graphite particles are broken into fine particles by the excessive rolling to increase the surface area of the negative electrode. The increased surface area of the negative electrode facilitates the decomposition reaction of the non-aqueous solvent contained in the battery, which occurs on the negative electrode surface. The decomposition reaction of the non-aqueous solvent increases the irreversible capacity of the negative electrode.

Furthermore, in the case where the negative electrode material mixture layer has a carbon density of not less than 1.6 g/cm$^3$, another problem arises that the capacity characteristics are largely reduced at high rate charge/discharge. The reason why the capacity characteristics are impaired is presumably because the basal planes of the flake graphite contained in the material mixture layer are oriented in parallel with the electrode plate surface since the negative electrode is excessively rolled, rendering it difficult for lithium ions to move within the negative electrode.

BRIEF SUMMARY OF THE INVENTION

The present invention is intended to solve the above-mentioned problems, and an object of the invention is to provide a high-capacity lithium ion secondary battery with low irreversible capacity and excellent high rate charge/discharge characteristics.

To be more specific, the present invention relates to a negative electrode for a lithium ion secondary battery comprising a material mixture layer, the material mixture layer comprising a carbonaceous material, the carbonaceous material comprising a spherical natural graphite (A) and a graphitized carbon fiber (B), wherein the material mixture layer has a carbon density of not less than 1.6 g/cm$^3$, which is determined by dividing the weight of the carbonaceous material by the volume of the material mixture layer; the spherical natural graphite (A) has: (1) an interplanar spacing $d_{002}$ between the (002) planes determined by an X-ray diffraction pattern of not less than 0.3354 nm and not more than 0.3357 nm, (2) a mean particle circularity of not less than 0.86, and (3) a mean particle size of not less than 5 μm and not more than 20 μm; the graphitized carbon fiber (B) has: (1) a mean fiber length of not less than 20 μm and not more than 200 μm, and (2) a mean aspect ratio of not less than 2 and not more than 10; and the amount of the graphitized carbon fiber (B) is not less than 50% by weight and not more than 90% by weight of whole of the carbonaceous material.

The present invention further relates to a lithium ion secondary battery comprising: (a) a positive electrode comprising a lithium-containing composite oxide represented by the chemical formula $Li_a(Co_{1-x-y}Mg_xM_y)_bO_c$, where M is at least one selected from the group consisting of Al, Mn, Zr, In and Sn, $0 \leq a \leq 1.05$, $0.01 \leq x \leq 0.2$, $0 \leq y \leq 0.02$, $0.85 \leq b \leq 1.1$, $1.8 \leq c \leq 2.1$; (b) the negative electrode in accordance with claim 1; and (c) a non-aqueous electrolyte.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
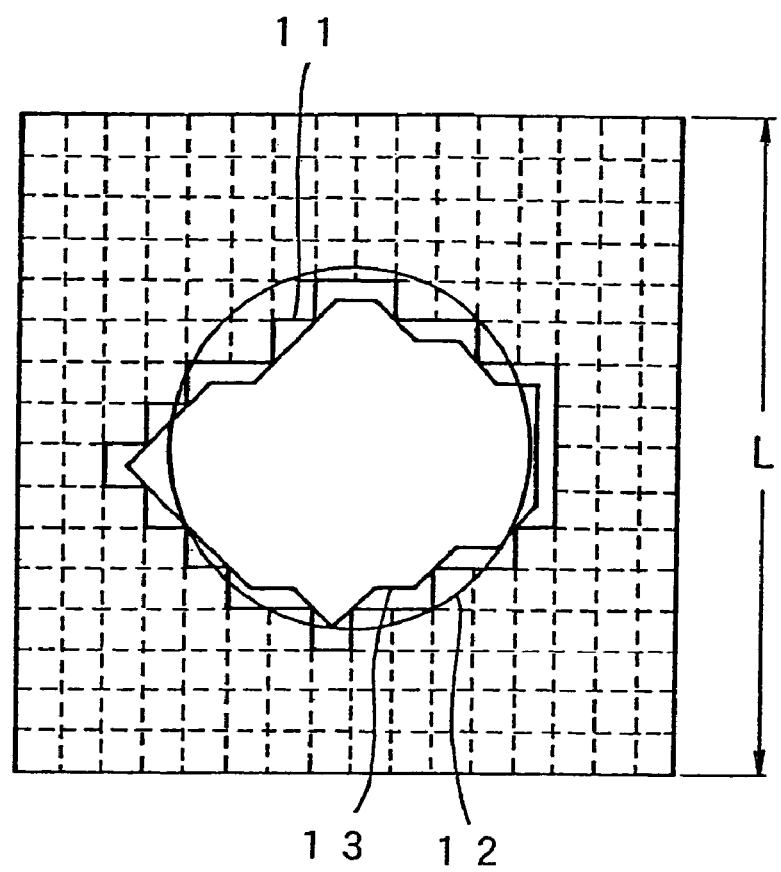
FIG. 1 is a binary image converted from a projected particle image.

In the case of the negative electrode in accordance with the present invention which uses a spherical natural graphite (A) with certain property, the irreversible capacity of graphite per weight is not increased even when a carbon density "Dc", which is determined by dividing the weight of the carbonaceous material in the negative electrode material mixture layer by the volume of the material mixture layer, is increased to 1.6 g/cm³ or greater. The reason why the irreversible capacity is not increased is presumably because the spherical natural graphite (A) particles in the negative electrode material mixture layer are not destroyed even when the material mixture layer is extremely rolled. In other words, in addition to the advantage that the spherical natural graphite (A) inherently has a relatively small specific surface area, the use of the spherical natural graphite (A) presumably avoids the enlargement of the specific surface area due to the rolling that would otherwise (in the case of using flake graphite) occur. Accordingly, the effect of reducing the irreversible capacity is extremely large. Besides, the spherical natural graphite (A) blends unexpectedly well with the graphitized carbon fiber (B) because, unlike the case of flake graphite, the basal planes in the spherical natural graphite (A) are not oriented in parallel with the electrode plate surface at the time of rolling. Therefore, it is possible to increase the carbon density "Dc" up to not less than 1.6 g/cm³ without destruction of the particles, as well as to form an excellent electron conductive network within the negative electrode.

The spherical natural graphite (A) has an interplanar spacing $d_{002}$ between the (002) planes determined by an X-ray diffraction pattern of not less than 0.3354 nm and not more than 0.3357 nm. Theoretically, pure graphite has an interplanar spacing $d_{002}$ of 0.3354 nm. When graphite is not sufficiently graphitized, the interplanar spacing $d_{002}$ exceeds 0.3357 nm. As a result, the charge/discharge capacity becomes small.

Commercially available natural graphite has a typical mean particle circularity of about 0.84, but the spherical natural graphite (A) used in the present invention has a mean particle circularity of not less than 0.86, preferably not less than 0.88. When the mean particle circularity is less than 0.86, graphite particles in the negative electrode material mixture layer are destroyed during the process in which the electrode plate is extremely rolled, or the spherical natural graphite (A) does not blend sufficiently with the graphitized carbon fiber (B). This increases the irreversible capacity of the negative electrode or impairs the high rate charge/discharge characteristics.

The particle circularity used herein is usually calculated from a two-dimensional projected image of a particle. In order to capture the projected image of a particle, first, a suspension containing particles is aspirated into a particle image analyzer, drawn into a flat cell and transformed into a flat sample flow. The sample flow is irradiated with a strobe light, and then images of particles passing through the cell are captured as freeze-frame images by a CCD camera via an objective lens. Each particle in the sample flow is hydrodynamically controlled so as to pass through the center of the cell. Accordingly, particle images are always captured in focus. Each captured particle image is usually processed on a real-time basis. The circle equivalent diameter and the particle circularity are calculated from the area and perimeter of the projected image of the particle.

The irradiation of a strobe light is performed about every 1/30th of a second, and the image of the particles present within the camera frame is captured. After a specified number of images are taken, the number of particles contained in the sample flow per unit volume is quantitatively calculated from the number of the particle images, the thickness of the cell, the size of the frame, etc. Accordingly, the mean particle circularity is calculated on a number basis. The particle size distribution may be calculated on either a number or volume basis.

Next, the particle circularity is defined below referring to FIG. 1.

The particle circularity is the value obtained by dividing the perimeter of a circle of equivalent area to the captured particle image by the perimeter of the captured particle image. In order to determine the particle circularity, the captured particle images are first classified according to their sizes. For example, in the case of the flow type particle image analyzer FPIA-2100 manufactured by Sysmex Corporation, the captured particle images are classified into 7 groups according to their sizes. Each captured particle image is divided into 512×512 pixel blocks, which is then binarized.

FIG. 1 shows one binary image converted from a captured particle image 11. In the case where the above analyzer FPIA-2100 is employed, the side length "L" of the equilateral rectangle including the captured particle image 11 is 1 to 160 μm. Then, a circle 12 of equivalent area to the captured particle image 11 is determined. The diameter of the equivalent circle 12 is calculated as a circle equivalent diameter, which can be used as a particle size. The length of a frame 13 formed by lines that connect the center of each pixel located on the outermost periphery of the captured particle image 11 is determined as the perimeter of the captured particle image. The particle circularity is obtained by dividing the perimeter of the equivalent circle 12 by the perimeter of the captured particle image 11 (i.e. the length of the frame 13).

The particle circularity is 1 when the captured particle image is a perfect circle, and is less than 1 when the captured particle image is oblong or has unevenness. For example, the particle circularity of an equilateral hexagon is 0.952, that of an equilateral pentagon is 0.930, that of an equilateral tetragon is 0.886, and that of an equilateral triangle is 0.777. In the case of tetragons, the particle circularity of a tetragon with an aspect ratio of 1:5 is 0.660, that of a tetragon with an aspect ratio of 1:7 is 0.586 and that of a tetragon with an aspect ratio of 1:17 is 0.405. In the case of particles of indefinite shape, the mean particle circularity slightly varies according to the scaling factor of the projected image or the number of pixels. However, it is considered that there is no substantial difference in mean circularity among particles of indefinite shape as long as commercially available particle image analyzers are used.

The spherical natural graphite (A) with a mean particle circularity of not less than 0.86 can be commercially produced by using, for example, flake natural graphite particles or flake artificial graphite particles as the raw material (Japanese Laid-Open Patent Publication No. Hei 11-263612). For example, flake graphite particles to be used as the raw material preferably have a mean particle size of 1 to 100 μm, preferably about 5 to 60 μm. The raw material particles are fed into an agitation device such as a fluidized-bed type counter jet mill, a jet stream is blown into the chamber located inside the mill to allow the particles to collide with each other and circulate in the chamber, then the particles are sieved to give spherical natural graphite (A) particles with a desired particle circularity.

The spherical natural graphite (A) has a mean particle size of not less than 5 μm and not more than 20 μm. When the mean particle size is less than 5 μm, the specific surface area is enlarged and side reaction with the electrolyte is likely to occur. Conversely, when the mean particle size exceeds 20 μm, a sufficient conductive network is not formed, making the high rate discharge characteristics insufficient. It should be noted that 50% particle size ($D_{50}$) determined on a volume basis may be used as the mean particle size.

The spherical natural graphite (A) preferably has a BET specific surface area of not less than 5 $m^2/g$ and not more than 10 $m^2/g$. When the BET specific surface area is less than 5 $m^2/g$, side reaction with the electrolyte is likely to occur. On the contrary, when the BET specific surface area exceeds 10 $m^2/g$, a sufficient conductive network is unlikely to be formed. Thus, the high rate discharge characteristics tend to be insufficient.

On the other hand, the graphitized carbon fiber (B) preferably has a mean fiber diameter of not less than 5 μm and not more than 20 μm. When the mean fiber diameter is less than 5 μm, the specific surface area of the fiber is enlarged and the side reaction with the electrolyte is likely to occur. Conversely, when the mean fiber diameter exceeds 20 μm, a sufficient conductive network is unlikely to be formed. Thus, the high rate discharge characteristics tend to be insufficient.

The graphitized carbon fiber (B) has a mean fiber length of not less than 20 μm and not more than 200 μm, preferably not less than 30 μm and not more than 60 μm. When the mean fiber length is less than 20 μm, the specific surface area of the fiber is enlarged and the side reaction with the electrolyte is likely to occur. On the contrary, when the mean fiber length exceeds 200 μm, it is difficult to fill the material mixture layer with the carbonaceous material with high density, or the high rate discharge characteristics are lowered.

The mean fiber diameter and the mean fiber length can be determined by, for example, observing SEM images. The mean fiber diameter is preferably determined from cross-sectional SEM images. The number of fibers to be observed is not specified, but it is preferred to observe 100 or more fibers to determine the mean values.

The graphitized carbon fiber (B) has a mean aspect ratio of not less than 2 and not more than 10, preferably not more than 5. When the mean aspect ratio exceeds 10, the carbon density "Dc" of the negative electrode material mixture layer is unable to be increased and remarkable improvement in the conductive network within the carbonaceous material cannot be expected. Conversely, when the mean aspect ratio is less than 2, the shape of the graphitized carbon fiber (B) approaches that of the spherical natural graphite (A). Therefore, the effect created by blending them becomes small. It is to be noted that the mean aspect ratio can be determined by dividing the mean fiber length by the mean fiber diameter (the mean fiber length/the mean fiber diameter).

The amount of the graphitized carbon fiber (B) is not less than 50% by weight and not more than 90% by weight of whole of the carbonaceous material. When the amount of the graphitized carbon fiber (B) is less than 50% by weight of whole of the carbonaceous material, the carbon density "Dc" of the negative electrode material mixture is excessively high, and the diameter of pores in the electrode plate is reduced to impair the permeability of the electrolyte, deteriorating the high rate discharge characteristics and the cycle life characteristics. Besides, the specific surface area of the whole of the carbonaceous material is enlarged to increase the amount of gas generated. On the contrary, when the amount of the graphitized carbon fiber (B) exceeds 90% by weight of the whole of the carbonaceous material, it is difficult to roll press the electrode plate. Accordingly, an electrode plate with high carbon density "Dc" cannot be obtained.

The starting material for the production of the graphitized carbon fiber (B) is not specifically limited. Examples include acrylic resin, phenolic resin, organic polymers such as polyamide resin, condensed polycyclic hydrocarbon compounds such as naphthalene and phenanthrene, petroleum-based pitch, coal-based pitch, etc.

Preferred are petroleum-based pitch, coal-based pitch and optically anisotropic pitch (i.e. mesophase pitch), and particularly mesophase pitch is preferred. It is preferred to use mesophase pitch with a mesophase content of 100%. However, any mesophase pitch can be used if it can be formed into fiber.

The method to melt-spin the material pitch is not specifically limited. Melt spinning, melt blowing, centrifugal spinning, vortex spinning, etc can be employed. Among them, melt blowing is particularly preferred because it yields excellent productivity and produces high quality fibers.

It is preferred to render the produced carbon fibers infusible before graphitization. Methods to render the fibers infusible include heating fibers in an oxidizing gas atmosphere, treating fibers with an aqueous solution of acid such as nitric acid or chromic acid, etc. Above all, heating fibers at 150 to 300° C. in an air is preferable.

The obtained infusible fibers can be graphitized by heating them in an inert gas atmosphere or under a reduced pressure. In the graphitization process, a boron compound is preferably added in order to facilitate graphitization. The graphitization is preferably performed at a temperature of not less than 2200° C., more preferably not less than 2400° C. The graphitized carbon fiber may have an interplanar spacing $d_{002}$ of, for example, 0.3354 to 0.3370 nm.

In the present invention, the positive electrode preferably comprises a lithium-containing composite oxide represented by the chemical formula $Li_a(Co_{1-x-y}Mg_xM_y)_bO_c$, where M is at least one selected from the group consisting of Al, Mn, Zr, In and Sn, $0 \leq a \leq 1.05$, $0.01 \leq x \leq 0.2$, $0 \leq y \leq 0.02$, $0.85 \leq b \leq 1.1$, $1.8 \leq c \leq 2.1$. Since such positive electrode has very high conductivity, the positive electrode, from the overall point of view, has good high rate charge/discharge characteristics, making it possible to give a battery which maintains high capacity, even when the conductivity of the negative electrode is slightly reduced as a result of achieving extremely high capacity. Accordingly, it is effective to use the above-described positive electrode in combination with the negative electrode of the present invention having the negative electrode material mixture layer with an extremely high carbon density "Dc".

When the positive electrode has a magnesium content "x" of less than 0.01, the conductivity of the composite oxide is not sufficiently improved because the magnesium content is too small. When the magnesium content "x" exceeds 0.2, on the other hand, the amount of gas generated in the battery is increased.

The composite oxide containing Al and/or Zr advantageously affects the storage and cycle life characteristics of the battery.

Likewise, the composite oxide containing Mn advantageously affects safety during overcharge of the battery.

When the sum of x and y (x+y) exceeds 0.22, disadvantages arise such as decreased charge/discharge capacity of the composite oxide and reduced capacity of the electrode plate due to the decreased tap density of the particles.

The non-aqueous electrolyte in accordance with the present invention comprises a non-aqueous solvent and a solute dissolved in the non-aqueous solvent. The non-aqueous solvent is not specifically limited. Any conventional non-aqueous solvent may be used. Preferred examples include cyclic carboxylic acid ester, cyclic carbonic acid ester having at least one carbon-to-carbon unsaturated bond, cyclic carbonic acid ester having no carbon-to-carbon unsaturated bond, non-cyclic carbonic acid ester, etc. They may be used singly or in any combination.

Examples of the cyclic carboxylic acid ester include γ-butyrolactone (GBL), γ-valerolactone (GVL), α-acetyl-γ-butyrolactone, α-methyl-γ-butyrolactone, β-methyl-γ-butyrolactone, α-angelicalactone, α-methylene-γ-butyrolactone, γ-hexanolactone, γ-nonanolactone, γ-octanolactone, γ-methyl-γ-decanolactone, etc.

Examples of the cyclic carbonic acid ester having at least one carbon-to-carbon unsaturated bond include vinylene carbonate, 3-methyl vinylene carbonate, 3,4-dimethyl vinylene carbonate, 3-ethyl vinylene carbonate, 3,4-diethyl vinylene carbonate, 3-propyl vinylene carbonate, 3,4-dipropyl vinylene carbonate, 3-phenyl vinylene carbonate, 3,4-diphenyl vinylene carbonate, vinyl ethylene carbonate (VEC), divinyl ethylene carbonate (DVEC), etc.

Examples of the cyclic carbonic acid ester having no carbon-to-carbon unsaturated bond include propylene carbonate (PC), ethylene carbonate (EC), butylene carbonate (BC), etc.

Examples of the non-cyclic carbonic acid ester include dimethyl carbonate (DMC), ethyl methyl carbonate (EMC), diethyl carbonate (DEC), etc.

It is preferred to further add cyclohexyl benzene, biphenyl, diphenyl ether, propanesultone, etc to the non-aqueous solvent as an additive resistant to overcharge.

The solute dissolved in the non-aqueous solvent is not specifically limited in the present invention. Any conventional solute for non-aqueous electrolyte secondary batteries can be used. Examples of the solute include $LiClO_4$, $LiAsF_6$, $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiB[C_6F_3(CF_3)_2$-3,5$]_4$, $LiPF_a(C_bF_{2b+1})_{6-a}$ where "a" is an integer from 1 to 5 and "b" is an integer not less than 1, $LiPF_c(C_dF_{2d+1}SO_2)_{6-c}$ where "c" is an integer from 1 to 5 and "d" is an integer not less than 1, $LiBF_e(C_fF_{2f+1})_{4-e}$ where "e" is an integer from 1 to 3 and "f" is an integer not less than 1, $LiBF_g(C_hF_{2h+1}SO_2)_{4-g}$ where "g" is an integer from 1 to 3 and "h" is an integer not less than 1. They may be used singly or in combination of two or more. At the same time, it is preferred to use $LiPF_6$ at least. Although the concentration of the solute in the non-aqueous electrolyte is not specifically limited, it is preferably 0.2 to 2 mol/liter, most preferably, 0.5 to 1.5 mol/liter.

The negative electrode in accordance with the present invention is produced using, for example, the method described below.

First, a predetermined amount of mixture of the spherical natural graphite (A) and the graphitized carbon fiber (B) is mixed with a binder and dispersion medium to prepare a negative electrode material mixture. This negative electrode material mixture is applied onto the both faces of a core material such as a copper foil current collector, which is then dried, rolled using a roller, and cut into a predetermined size to give a negative electrode comprising a core material and a negative electrode material mixture layer. In the rolling step for obtaining the negative electrode in accordance with the present invention, the electrode plate should be sufficiently rolled until the negative electrode material mixture layer has a carbon density "Dc" of not less than 1.6 $g/cm^3$.

As the binder, either of a thermoplastic resin or a thermosetting resin can be used, or they can be used in combination with each other. Among them, preferred are polyvinylidene fluoride (PVdF) and polytetrafluoroethylene (PTFE), and particularly PVdF is preferred. The use of PVdF with a molecular weight of not less than 150000 improves the binding strength. Even an extremely small amount of the PVdF gives an electrode plate with sufficient strength. Because, when PVdF with a molecular weight of not less than 150000 is used, it is possible to reduce the amount of insulating binder, a synergetic effect, such as improvement in the load characteristics of the electrode, eventually in those of the battery, is obtained. On the other hand, the use of PVdF with a molecular weight of not less than 350000 lowers the load characteristics, and the cycle characteristics tend to be degraded.

The positive electrode is produced using, for example, the method described below.

First, the above-mentioned composite oxide is mixed with a conductive material, binder and dispersion medium to prepare a positive electrode material mixture. This positive electrode material mixture is applied onto the both faces of a core material such as an aluminum foil current collector, which is then dried, rolled using a roller and cut into a predetermined size to give a positive electrode comprising a core material and a positive electrode material mixture layer.

As the conductive material, any electron-conductive material can be used if the material does not cause any chemical change in the assembled battery. Examples include carbon blacks such as acetylene black, ketjen black, channel black, furnace black, lamp black and thermal black, and natural graphite such as flake graphite, artificial graphite, conductive carbon fiber, etc. They may be used singly or in combination of two or more. Among these conductive materials, particularly preferred are carbon black, graphite powder and carbon fiber.

Since the composite oxide used as the positive electrode active material in the present invention has high conductivity, the amount of the conductive material to be contained in the positive electrode material mixture can be reduced to not more than 3.0 parts by weight per 100 parts by weight of the positive electrode active material. Along with this, it is also possible to reduce the amount of the binder necessary to cover the conductive material. Specifically, even when the amount of the binder is not more than 4 parts by weight per 100 parts by weight of the positive electrode active material, an electrode plate with sufficient strength can be obtained.

As the binder and dispersion medium to be used for the positive electrode, similar materials as those used in the production of the negative electrode can be employed.

In the following, the present invention is explained based on examples.

EXAMPLE 1

(i) Production of Positive Electrode

A positive electrode material mixture paste was obtained by mixing 100 parts by weight of $LiCoO_2$ as the positive electrode active material, 4.0 parts by weight of acetylene black as the conductive material and 2 parts by weight of polyvinylidene fluoride with a molecular weight of 300,000 (PVdF) as the binder with N-methyl-2-pyrrolidone as the dispersion medium, followed by stirring.

The positive electrode material mixture was applied on both faces of an aluminum foil current collector with a thickness of 15 μm, which was then dried, rolled using a roller and cut into a predetermined size to give a positive electrode.

(ii) Production of Negative Electrode

A negative electrode material mixture paste was obtained by mixing 100 parts by weight of carbonaceous material, 1 part by weight of carboxymethyl cellulose as the thickener and 2 parts by weight of styrene butadiene rubber as the binder with water as the dispersion medium, followed by stirring.

As the carbonaceous material, samples A1 to R9 with the compositions and properties shown in Table 1 were used. It should be noted that, in Table 1, MCF represents mesophase carbon fiber and MCMB represents mesophase carbon micro beads.

Additionally, MCF had an interplanar spacing $d_{002}$ of 0.3363 nm, and the spherical natural graphite and spherical artificial graphite respectively had an interplanar spacing $d_{002}$ of 0.3356 nm.

TABLE 1

| Sample | Carbonaceous material | Content (wt %) Spherical graphite | MCF | Particle circularity | Graphite particle size (μm) | Aspect ratio of fiber (length/diameter) |
|---|---|---|---|---|---|---|
| A1 | MCF + spherical natural graphite | 25 | 75 | 0.88 | 10 | 4(32/8) |
| A2 | MCF + spherical artificial graphite | 25 | 75 | 0.87 | 10 | 4(32/8) |
| B1 | MCF + spherical natural graphite | 25 | 75 | 0.86 | 5 | 4(32/8) |
| B2 | MCF + spherical natural graphite | 25 | 75 | 0.90 | 10 | 4(32/8) |
| B3 | MCF + spherical natural graphite | 25 | 75 | 0.88 | 15 | 4(32/8) |
| B4 | MCF + spherical natural graphite | 25 | 75 | 0.88 | 20 | 4(32/8) |
| B5 | MCF + spherical natural graphite | 25 | 75 | 0.86 | 25 | 4(32/8) |
| C1 | MCF + spherical natural graphite | 10 | 90 | 0.88 | 10 | 4(32/8) |
| C2 | MCF + spherical natural graphite | 20 | 80 | 0.88 | 10 | 4(32/8) |
| C3 | MCF + spherical natural graphite | 40 | 60 | 0.88 | 10 | 4(32/8) |
| C4 | MCF + spherical natural graphite | 50 | 50 | 0.88 | 10 | 4(32/8) |
| C5 | MCF + spherical natural graphite | 55 | 45 | 0.88 | 10 | 4(32/8) |
| C6 | MCF + spherical natural graphite | 60 | 40 | 0.88 | 10 | 4(32/8) |
| D1 | MCF + spherical natural graphite | 25 | 75 | 0.83 | 15 | 4(32/8) |
| D2 | MCF + spherical natural graphite | 25 | 75 | 0.85 | 15 | 4(32/8) |
| D3 | MCF + spherical natural graphite | 25 | 75 | 0.86 | 15 | 4(32/8) |
| D4 | MCF + spherical natural graphite | 25 | 75 | 0.88 | 15 | 4(32/8) |
| E1 | MCF + spherical natural graphite | 25 | 75 | 0.88 | 10 | 12(240/20) |
| E2 | MCF + spherical natural graphite | 25 | 75 | 0.88 | 10 | 10(200/20) |
| E3 | MCF + spherical natural graphite | 25 | 75 | 0.88 | 10 | 10(100/10) |
| E4 | MCF + spherical natural graphite | 25 | 75 | 0.88 | 10 | 5(60/12) |
| E5 | MCF + spherical natural graphite | 25 | 75 | 0.88 | 10 | 2(30/15) |
| E6 | MCF + spherical natural graphite | 25 | 75 | 0.88 | 10 | 2(20/10) |
| E7 | MCF + spherical natural graphite | 25 | 75 | 0.88 | 10 | 1(10/10) |
| R1 | MCMB | 0 | 0 | — | — | — |
| R2 | Flake natural graphite | 0 | 0 | — | — | — |
| R3 | Flake artificial graphite | 0 | 0 | — | — | — |
| R4 | MCF | 0 | 100 | — | — | 4(32/8) |
| R5 | Spherical natural graphite | 100 | 0 | — | — | — |
| R6 | Spherical artificial graphite | 100 | 0 | — | — | — |
| R7 | MCF + MCMB | 0 | 75 | 0.95 | 20 | 4(32/8) |
| R8 | MCF + flake natural graphite | 0 | 75 | 0.72 | 20 | 4(32/8) |

TABLE 1-continued

| Sample | Carbonaceous material | Content (wt %) Spherical graphite | MCF | Particle circularity | Graphite particle size (μm) | Aspect ratio of fiber (length/diameter) |
|---|---|---|---|---|---|---|
| R9 | MCF + flake artificial graphite | 0 | 75 | 0.78 | 20 | 4(32/8) |

The negative electrode material mixture was applied on both faces of a copper foil current collector with a thickness of 10 μm, which was then dried, rolled using a roller to form a material mixture layer having a specified carbon density "Dc", cut into a predetermined size to give a negative electrode.

This example produced respective negative electrodes with a carbon density "Dc" of 1.4 g/cm$^3$, 1.5 g/cm$^3$, 1.6 g/cm$^3$ and 1.65 g/cm$^3$.

(iii) Assembly of Battery

Figure 2:
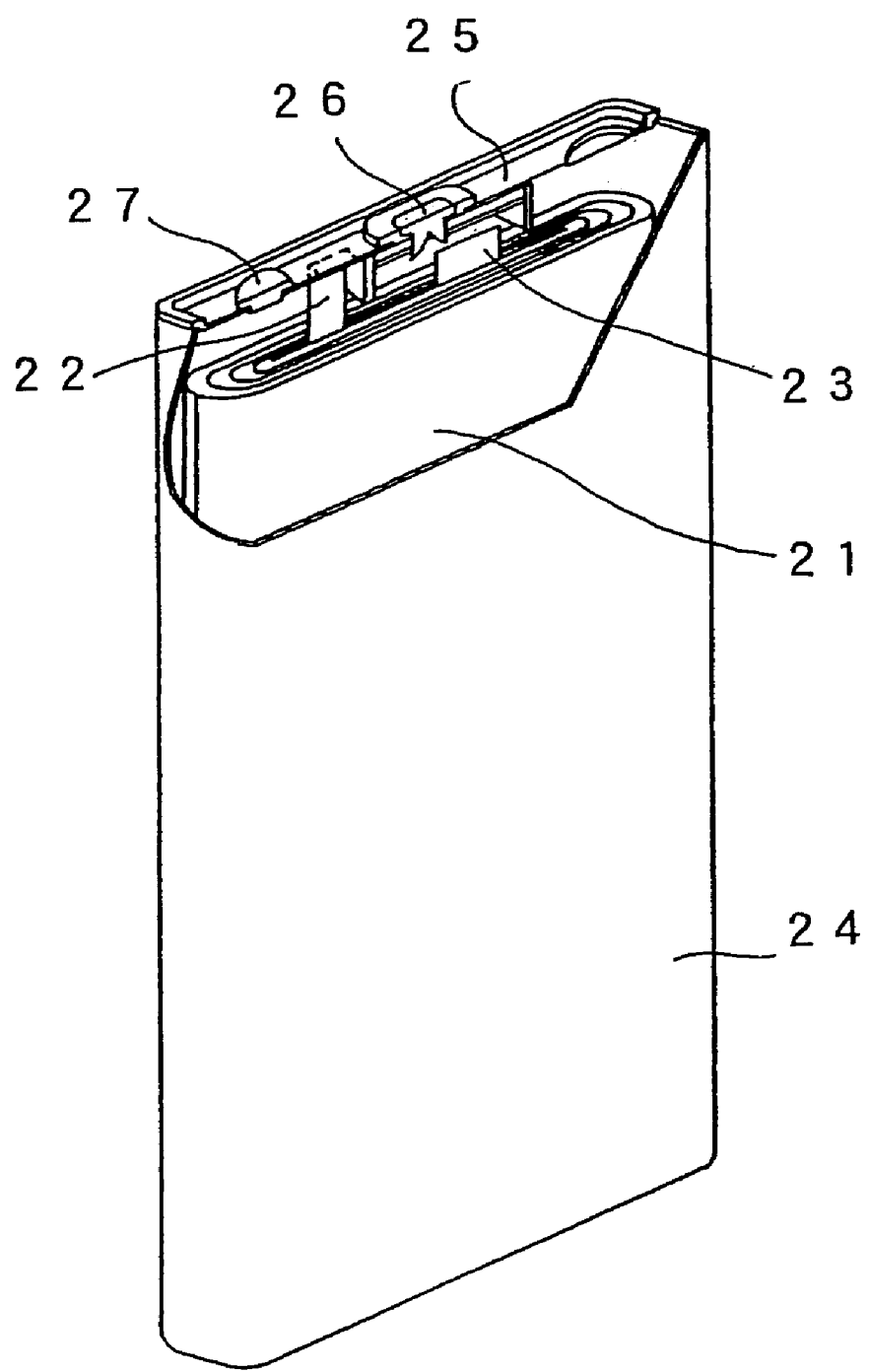
FIG. 2 is a partially cutaway oblique view of a prismatic battery in accordance with one embodiment of the present invention.

A thin prismatic lithium-ion secondary battery as shown in FIG. 2 was assembled.

First, the positive electrode, the predetermined negative electrode and a 20 μm thick microporous polyethylene separator interposed therebetween were spirally wound into an ellipse to give an electrode assembly 21. To the positive and negative electrodes were respectively welded ends of a positive electrode lead 22 and a negative electrode lead 23. On the top of the electrode assembly 21, an insulating ring made of polyethylene was provided, and the electrode assembly 21 was inserted in a thin prismatic aluminum case 24 as shown in FIG. 2. The insulating ring is not shown in FIG. 2. Another end of the positive electrode lead 22 was spot-welded to an aluminum sealing plate 25. Another end of the negative electrode lead 23 was spot-welded to the lower part of a negative electrode terminal 26 made of nickel located at the center of the sealing plate 25. The opening edge of the battery case 24 and the sealing plate 25 were laser-welded, and a specified amount of non-aqueous electrolyte was injected from the inlet. Then, an aluminum sealing stopper 27 was inserted into the inlet, which was then laser-welded for sealing.

The non-aqueous electrolyte was prepared by dissolving LiPF$_6$ at a concentration of 1.0 mol/l in a solvent mixture of ethylene carbonate and ethyl methyl carbonate at a volume ratio of 1:3. Additionally, 1 part by weight of cyclohexyl benzene was added as an additive resistant to overcharge per 100 parts by weight of the non-aqueous solvent.

The assembled battery was of type 533048 and had a width of 30 mm, a height of 48 mm and a thickness of 5.3 mm.

The batteries with the negative electrodes using the samples A1 to R9 were referred to as Batteries A1 to R9.

It should be noted that, although this example produced thin prismatic batteries, the shape of the battery in accordance with the present invention is not limited to the prismatic shape. The battery of the present invention may be thin, cylindrical, coin-shaped, button-shaped, sheet-shaped, stacked or flat-shaped. The present invention is also applicable to large-scale batteries for electric vehicles.

[Battery Evaluation]

(i) Irreversible Capacity (Re)

At a temperature of 25° C., each battery was charged at a current value of 0.2 C (at a 5-hour rate) up to a battery voltage of 4.2 V, and then discharged at a current value of 0.2 C (at a 5-hour rate) down to a battery voltage of 2.75 V. This charge/discharge cycle was repeated three times. Subsequently, its irreversible capacity (Re) per 1 g of the carbonaceous material was determined from the sum of the differences between the charge and discharge capacity.

(ii) High Rate Charge/Discharge Characteristics

At a temperature of 25° C., each battery was charged at a current value of 0.7 C up to a battery voltage of 4.2 V, and was kept charged at a constant voltage until the current value reached 0.05 C. Then, the battery was discharged at a current value of 0.2 C down to a battery voltage of 2.75 V. At this time, its discharge capacity ($C_{0.2}$) was determined.

Thereafter, the battery was again charged at a current value of 0.7 C up to a battery voltage of 4.2 V, and was kept charged at a constant voltage until the current value reached 0.05 C. Then, the battery was discharged at a current value of 2.0 C (at a 0.5-hour rate) down to a battery voltage of 2.75 V. At this time, its discharge capacity ($C_{2.0}$) was determined.

The percentage (2C/0.2C) of the discharge capacity at a current value of 2.0 C ($C_{2.0}$) to that of 0.2 C ($C_{0.2}$) was calculated.

Table 2 shows the relation between the carbon density "Dc" of the material mixture layer of the negative electrodes used for Batteries A1 to R9 and the obtained evaluation results.

TABLE 2

| | Carbon density | | | | | | | |
|---|---|---|---|---|---|---|---|---|
| | 1.4(g/cm$^3$) | | 1.5(g/cm$^3$) | | 1.6(g/cm$^3$) | | 1.65(g/cm$^3$) | |
| Battery | Re (mAh/g) | 2 C/0.2 C (%) | Re (mAh/g) | 2 C/0.2 C (%) | Re (mAh/g) | 2 C/0.2 C (%) | Re (mAh/g) | 2 C/0.2 C (%) |
| A1 | 23 | 93 | 25 | 93 | 27 | 92 | 28 | 90 |
| A2 | 22 | 90 | 26 | 87 | 28 | 84 | 32 | 80 |
| B1 | 25 | 92 | 27 | 91 | 29 | 89 | 30 | 88 |
| B2 | 23 | 93 | 25 | 93 | 27 | 92 | 28 | 90 |
| B3 | 22 | 92 | 24 | 91 | 26 | 91 | 28 | 90 |
| B4 | 23 | 92 | 23 | 92 | 26 | 91 | 27 | 90 |

TABLE 2-continued

| | Carbon density | | | | | | | |
|---|---|---|---|---|---|---|---|---|
| | 1.4(g/cm$^3$) | | 1.5(g/cm$^3$) | | 1.6(g/cm$^3$) | | 1.65(g/cm$^3$) | |
| Battery | Re (mAh/g) | 2 C/0.2 C (%) | Re (mAh/g) | 2 C/0.2 C (%) | Re (mAh/g) | 2 C/0.2 C (%) | Re (mAh/g) | 2 C/0.2 C (%) |
| B5 | 20 | 87 | 21 | 85 | 23 | 84 | 25 | 80 |
| C1 | 21 | 93 | 23 | 91 | 26 | 90 | 24 | 90 |
| C2 | 23 | 93 | 25 | 92 | 26 | 92 | 27 | 90 |
| C3 | 24 | 93 | 27 | 91 | 29 | 91 | 30 | 90 |
| C4 | 25 | 92 | 28 | 91 | 28 | 90 | 30 | 89 |
| C5 | 26 | 90 | 29 | 89 | 30 | 88 | 31 | 85 |
| C6 | 28 | 88 | 31 | 85 | 32 | 83 | 35 | 81 |
| D1 | 23 | 87 | 22 | 85 | 24 | 83 | 28 | 81 |
| D2 | 22 | 88 | 22 | 85 | 26 | 84 | 27 | 81 |
| D3 | 23 | 92 | 22 | 92 | 25 | 90 | 28 | 89 |
| D4 | 23 | 92 | 23 | 92 | 26 | 91 | 27 | 90 |
| E1 | 30 | 94 | 32 | 93 | 34 | 91 | Unable to produce | |
| E2 | 25 | 94 | 27 | 93 | 29 | 91 | 30 | 90 |
| E3 | 24 | 94 | 26 | 93 | 28 | 91 | 30 | 89 |
| E4 | 23 | 93 | 25 | 93 | 28 | 91 | 29 | 89 |
| E5 | 22 | 92 | 23 | 92 | 26 | 91 | 28 | 89 |
| E6 | 21 | 91 | 23 | 91 | 25 | 90 | 27 | 88 |
| E7 | 21 | 88 | 22 | 87 | 24 | 84 | 26 | 80 |
| R1 | 22 | 92 | | | Unable to produce | | | |
| R2 | 36 | 87 | 36 | 85 | 38 | 81 | 41 | 79 |
| R3 | 36 | 86 | 36 | 84 | 39 | 80 | 43 | 78 |
| R4 | 18 | 93 | 20 | 92 | Unable to produce | | | |
| R5 | 35 | 89 | 35 | 85 | 37 | 85 | 40 | 81 |
| R6 | 35 | 89 | 35 | 84 | 36 | 83 | 40 | 79 |
| R7 | 23 | 92 | 23 | 91 | Unable to produce | | | |
| R8 | 30 | 90 | 30 | 88 | 34 | 85 | 36 | 83 |
| R9 | 33 | 90 | 33 | 87 | 34 | 85 | 37 | 81 |

EXAMPLE 2

<Investigation of Positive Electrode Active Material>

Batteries F1 to F17 analogous to Battery B4 of EXAMPLE 1 were produced except that lithium-containing composite oxides with compositions shown in Table 3 were used as the positive electrode active material instead of LiCoO$_2$. The carbon density "Dc" of the negative electrode material mixture layer was 1.65 g/cm$^3$. Additionally, in the positive electrode, 2 parts by weight of the conductive material was used per 100 parts by weight of the positive electrode active material. The reason why the amount of the conductive material is reduced is because Mg-added positive electrode active material has extremely high conductivity.

TABLE 3

| Battery | LiCo$_{1-x-y}$Mg$_x$M$_y$O$_2$ | Discharge Capacity | Capacity retention rate | Exothermic temperature (°C.) |
|---|---|---|---|---|
| F1 | x = 0.005, y = 0 | 105 | — | — |
| F2 | x = 0.01, y = 0 | 110 | — | — |
| F3 | x = 0.04, y = 0 | 115 | — | — |
| F4 | x = 0.2, y = 0 | 112 | — | — |
| F5 | x = 0.4, y = 0 | 100 | — | — |
| F6 | M = Al, x = 0.04, y = 0.0005 | 110 | 80 | 240 |
| F7 | M = Al, x = 0.04, y = 0.005 | 109 | 83 | 250 |
| F8 | M = Al, x = 0.04, y = 0.01 | 105 | 85 | 260 |
| F9 | M = Al, x = 0.04, y = 0.02 | 101 | 90 | 265 |
| F10 | M = Zr, x = 0.04, y = 0.0005 | 110 | 74 | 235 |
| F11 | M = Zr, x = 0.04, y = 0.005 | 108 | 77 | 245 |
| F12 | M = Zr, x = 0.04, y = 0.01 | 106 | 79 | 255 |
| F13 | M = Zr, x = 0.04, y = 0.02 | 100 | 84 | 260 |
| F14 | M = Mn, x = 0.04, y = 0.0005 | 102 | 73 | 250 |
| F15 | M = Mn, x = 0.04, y = 0.005 | 105 | 75 | 260 |
| F16 | M = Mn, x = 0.04, y = 0.01 | 103 | 77 | 270 |
| F17 | M = Mn, x = 0.04, y = 0.02 | 100 | 82 | 275 |
| R8 | x = 0, y = 0 | 93 | — | — |
| R10 | M = Al, x = 0.04, y = 0.005 | 95 | — | — |

The following evaluation was conducted using the obtained batteries.

[Initial Discharge Capacity]

At an environmental temperature of 20° C., Batteries F1 to F17 were put through the repeated charge/discharge cycles. In the charge/discharge cycle, charging was performed at a constant maximum current of 600 mA with the end-of-charge voltage set at 4.2 V. When the voltage reached 4.2 V, the battery was charged at constant voltage for 2 hours. Discharging was performed at a constant current of 600 mA with the end-of-charge voltage set at 3.0 V.

Battery B4 was also put through the same operation.

Table 3 shows the relative value of the discharge capacity at the first cycle of each battery calculated by setting the discharge capacity at the first cycle of Battery B4 to 100 as a standard value.

[Capacity Retention Rate]

With respect to Batteries F6 to F17 which were put through the above charge/discharge cycles, the percentage of the discharge capacity at the 100th cycle to that at the first cycle was calculated to obtain a capacity retention rate.

Table 3 shows the relative value of the capacity retention rate of each battery calculated by setting the capacity retention rate of Battery B4 to 100 as a standard value.

[Exothermic Temperature]

In the above charge/discharge cycles, after the 3rd charge/discharge cycle was completed, Batteries F6 to F17 were charged at a constant maximum current of 600 mA with end-of-charge voltage set at 4.4 V at an environmental temperature of 20° C. After the voltage reached 4.4 V, they were further charged at constant voltage for 2 hours. After the completion of the charging, the batteries were disassembled and the positive electrode material mixture was taken out of the positive electrodes. The positive electrode material mixture in an amount of 2 mg was put in a pan made of stainless steel for DSC measurement that gives a thermal stability index. The measurement was performed with RIGAKU Thermo Plus (manufactured by Rigaku Corporation) from room temperature to 400° C. at a heating rate of 10° C./min in an air atmosphere. Table 3 shows the first exothermic temperatures observed at the measurement of the positive electrode material mixture layers.

Meanwhile, Battery R10 analogous to Battery R8 was produced except that $LiCo_{0.955}Mg_{0.04}Al_{0.005}O_2$ was used as the positive electrode active material instead of $LiCoO_2$, and the evaluation was also made on this battery. The results are shown in Table 3.

Table 3 indicates that the addition of Mg to the positive electrode active material increases electron-conductivity so that the amount of the conductive material to be contained in the positive electrode can be reduced to expand the capacity of the battery.

From the overall point of view, Batteries F1 to F17 had even better high rate charge/discharge characteristics than Battery B4 because the Mg-added positive electrode active material had very high conductivity.

Table 3 also indicates that the addition of Al or Zr to the positive electrode active material improves the cycle characteristics of the battery and that the addition of Mn to the positive electrode active material improves safety when the battery is overcharged.

Moreover, the comparison between Batteries R8 and R10 reveals that a high-capacity battery cannot be obtained without using the negative electrode of the present invention even if Mg or Al is added to the positive electrode active material. In the case of Battery R10, the positive electrode had excellent conductivity, but the conductivity of the negative electrode was insufficient due to the orientation of basal planes in the graphite. Therefore, it is considered that the battery capacity was not improved because the battery was restricted by the negative electrode.

As described above, the present invention can provide a high-capacity lithium ion secondary battery with low irreversible capacity and excellent high rate charge/discharge characteristics.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A negative electrode for a lithium ion secondary battery comprising a material mixture layer, said material mixture layer comprising a carbonaceous material, said carbonaceous material comprising a spherical graphite (A) and a graphitized carbon tibet (B), wherein said materiat mixture layer has a carbon density of not less than 1.6 g/cm³, which is determined by dividing the weight of said carbonaceous material by the volume of said material mixture layer;

said spherical natural graphite (A) has:
(1) an interplanar spacing d002 between the (002) planes determined by an X-ray diffraction pattern of not less than 0.3354 nm and not more than 0.3357 nm,
(2) a mean particle circularity of not less than 0.86, and
(3) a mean particle size of not less than 5 μm and not more than 20 μm;

said graphitized carbon fiber (B) has:
(1) a mean fiber length of not less than 20 μm, and not more than 200 μm, and
(2) a mean aspect ratio of not less than 2 and not more than 10; and the amount of said graphitized carbon fiber (B) is not less than 60% by weight and not more than 80% by weight of whole of said carbonaceous material.

2. A lithium ion secondary battery comprising:
(a) a positive electrode comprising a lithium-containing composite oxide represented by the chemical formula

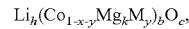

where M is at least one selected from the group consisting of Al, Mn, Zr, In and Sn, $0 \leq a \leq 1.05$, $0.01 \leq x \leq 0.2$, $0 \leq y \leq 0.02$, $0.85 \leq b \leq 1.1$, $1.8 \leq c \leq 2.1$;
(b) the negative electrode in accordance wit claim 1; and
(c) a non-aqueous electrolytc.

* * * * *

UNITED STATES PATENT AND TRADEMARK OFFICE
CERTIFICATE OF CORRECTION

| | |
|---|---|
| PATENT NO. | : 7,144,659 B2 |
| APPLICATION NO. | : 10/614023 |
| DATED | : December 5, 2006 |
| INVENTOR(S) | : Yusuke Fukumoto et al. |

It is certified that error appears in the above-identified patent and that said Letters Patent is hereby corrected as shown below:

Title Page,

Item "(56) References Cited", under "U.S. PATENT DOCUMENTS",
Change second listed reference number "2002/0037458 A1" to
-- 2002/0037456 A1 --.

Signed and Sealed this

Eighteenth Day of March, 2008

JON W. DUDAS
*Director of the United States Patent and Trademark Office*